United States Patent
Hegyi et al.

(10) Patent No.: US 10,250,823 B2
(45) Date of Patent: Apr. 2, 2019

(54) LIQUID CRYSTAL FOURIER TRANSFORM IMAGING SPECTROMETER

(71) Applicant: PALO ALTO RESEARCH CENTER INCORPORATED, Palo Alto, CA (US)

(72) Inventors: Alex Hegyi, San Francisco, CA (US); Joerg Martini, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 15/605,642

(22) Filed: May 25, 2017

(65) Prior Publication Data

US 2017/0264835 A1    Sep. 14, 2017

Related U.S. Application Data

(62) Division of application No. 14/527,378, filed on Oct. 29, 2014.

(51) Int. Cl.
| | |
|---|---|
| *G01J 3/45* | (2006.01) |
| *H04N 5/33* | (2006.01) |
| *G01J 3/00* | (2006.01) |
| *G01J 3/02* | (2006.01) |
| *G01J 3/28* | (2006.01) |
| *G01J 3/44* | (2006.01) |
| *G01J 3/453* | (2006.01) |

(Continued)

(52) U.S. Cl.
CPC ............... *H04N 5/332* (2013.01); *G01J 3/00* (2013.01); *G01J 3/0208* (2013.01); *G01J 3/0224* (2013.01); *G01J 3/0229* (2013.01); *G01J 3/0272* (2013.01); *G01J 3/0291* (2013.01); *G01J 3/28* (2013.01); *G01J 3/2803* (2013.01); *G01J 3/2823* (2013.01); *G01J 3/44* (2013.01); *G01J 3/4531* (2013.01); *G02F 1/13* (2013.01); *G01J 2003/1269* (2013.01); *G01J 2003/1291* (2013.01); *G01J 2003/2826* (2013.01)

(58) Field of Classification Search
CPC ... H04N 5/332; G01J 3/00; G01J 3/0205; G01J 3/0213; G01J 3/0224; G01J 3/45; G01J 3/453; G01J 3/4531; G01J 3/2823; G01J 3/2826; G01B 9/02062; G01B 9/02067; G01B 9/02072
USPC ........................................................ 356/456
See application file for complete search history.

(56) References Cited

U.S. PATENT DOCUMENTS

| | | |
|---|---|---|
| 4,342,516 A | 8/1982 | Chamran et al. |
| 4,812,657 A | 3/1989 | Minekane |
| 4,848,877 A | 7/1989 | Miller |

(Continued)

OTHER PUBLICATIONS

Itoh, K., et al., "Liquid-crystal imaging Fourier-spectrometer array," Optics Letters, 15:11, 652-654, Jun. 1, 1990.

(Continued)

*Primary Examiner* — Tarifur R Chowdhury
*Assistant Examiner* — Jonathon Cook
(74) *Attorney, Agent, or Firm* — Hollingsworth Davis, LLC

(57) ABSTRACT

A method of operating a hyperspectral imaging device includes receiving a light beam at a liquid crystal retarding device, and driving the liquid crystal retarding device with a pre-computed voltage waveform, wherein the voltage waveform is selected to reach a target optical retardance over time for the liquid crystal retarding device.

8 Claims, 11 Drawing Sheets

(51) Int. Cl.
*G02F 1/13* (2006.01)
*G01J 3/12* (2006.01)

(56) References Cited

U.S. PATENT DOCUMENTS

| | | | |
|---|---|---|---|
| 4,905,169 | A | 2/1990 | Buican et al. |
| 5,247,378 | A | 9/1993 | Miller |
| 5,347,382 | A | 9/1994 | Rumbaugh |
| 5,619,266 | A | 4/1997 | Tomita et al. |
| 5,642,214 | A | 6/1997 | Ishii |
| 5,784,162 | A | 7/1998 | Cabib et al. |
| 5,856,842 | A | 1/1999 | Tedesco |
| 5,953,083 | A | 9/1999 | Sharp |
| 6,169,594 | B1 | 1/2001 | Aye et al. |
| 6,421,131 | B1 | 7/2002 | Miller |
| 6,552,836 | B2 | 4/2003 | Miller |
| 6,576,886 | B1 | 7/2003 | Yao |
| 6,774,977 | B1 | 8/2004 | Walton et al. |
| 7,067,795 | B1 | 6/2006 | Yan et al. |
| 7,116,370 | B1 | 10/2006 | Huang |
| 7,339,665 | B2 | 3/2008 | Imura |
| 7,999,933 | B2 | 8/2011 | Mcclure |
| 8,422,119 | B1 | 4/2013 | Keaton |
| 9,631,973 | B2 | 4/2017 | Dorschner |
| 2004/0036876 | A1 | 2/2004 | Davis et al. |
| 2004/0165101 | A1 | 8/2004 | Miyanari et al. |
| 2005/0190329 | A1 | 9/2005 | Okumura |
| 2006/0187974 | A1* | 8/2006 | Dantus ............... G01J 11/00 372/9 |
| 2006/0279732 | A1 | 12/2006 | Wang |
| 2007/0003263 | A1 | 1/2007 | Nomura |
| 2007/0070354 | A1* | 3/2007 | Chao ............... G01J 3/2823 356/453 |
| 2008/0158550 | A1 | 7/2008 | Arieli et al. |
| 2008/0212874 | A1 | 9/2008 | Steib |
| 2008/0266564 | A1 | 10/2008 | Themelis |
| 2008/0278593 | A1 | 11/2008 | Cho et al. |
| 2009/0284708 | A1 | 11/2009 | Abdulhalim |
| 2010/0056928 | A1 | 3/2010 | Zuzak |
| 2011/0012014 | A1 | 1/2011 | Livne et al. |
| 2011/0170098 | A1* | 7/2011 | Normand ............... G01J 3/28 356/327 |
| 2011/0273558 | A1* | 11/2011 | Subbiah ............... G01J 3/02 348/89 |
| 2011/0279744 | A1 | 11/2011 | Voigt |
| 2011/0299089 | A1 | 12/2011 | Wang et al. |
| 2012/0013722 | A1 | 1/2012 | Wong et al. |
| 2012/0013922 | A1 | 1/2012 | Wong et al. |
| 2012/0268745 | A1 | 10/2012 | Kudenov |
| 2012/0300143 | A1* | 11/2012 | Voigt ............... G02B 5/208 349/18 |
| 2013/0010017 | A1 | 1/2013 | Kobayashi et al. |
| 2013/0027516 | A1 | 1/2013 | Hart |
| 2013/0107260 | A1 | 5/2013 | Nozawa |
| 2014/0125990 | A1 | 5/2014 | Hinderling et al. |
| 2014/0257113 | A1* | 9/2014 | Panasyuk ............. A61B 5/0075 600/476 |
| 2014/0354868 | A1 | 12/2014 | Desmarais |
| 2014/0362331 | A1* | 12/2014 | Shi ............... G02F 1/13363 349/117 |
| 2015/0022809 | A1 | 1/2015 | Marchant et al. |
| 2015/0168210 | A1 | 6/2015 | Dorschner |
| 2015/0206912 | A1 | 7/2015 | Kanamori |
| 2016/0123811 | A1 | 5/2016 | Hegyi et al. |
| 2016/0127660 | A1 | 5/2016 | Hegyi et al. |
| 2016/0127661 | A1 | 5/2016 | Hegyi et al. |
| 2017/0264834 | A1 | 9/2017 | Hegyi et al. |

OTHER PUBLICATIONS

Smith et al., "Increased acceptance bandwidths in optical frequency conversion by use of multiple walk-off-compensating nonlinear crystals," J. Opt. Soc. Am B/vol. 15, No. 1, Jan. 1998.
Persons et al., "Automated registration of polarimetric imagery using Fourier transform techniques," Polarization Measurement, Analysis, and Applications V, Dennis H. Goldstein, David B. Chenault, editors, Proceedings of SPIE vol. 4819 (2002).
File History for U.S. Appl. No. 14/527,347, 420 pages.
File History for U.S. Appl. No. 14/527,378, 205 pages.
File History for U.S. Appl. No. 14/883,404, 294 pages.
U.S. Appl. No. 15/827,204, filed Nov. 30, 2017.
U.S. Appl. No. 15/858,338, filed Dec. 29, 2017.
U.S. Appl. No. 15/858,354, filed Dec. 29, 2017.
U.S. Appl. No. 15/858,368, filed Dec. 29, 2017.
U.S. Appl. No. 15/858,609, filed Dec. 29, 2017.
File History for U.S. Appl. No. 15/858,354, 96 pages.
File History for U.S. Appl. No. 14/527,378, 354 pages.
File History for U.S. Appl. No. 14/527,347, 504 pages.
File History for U.S. Appl. No. 15/605,625, 116 pages.
File History for U.S. Appl. No. 14/883,404, 266 pages.
File History for EP App. No. 15190915.7 as retrieved from the European Patent Office Electronic File System on Sep. 25, 2018, 306 pages.
Office Action dated Aug. 8, 2018 from CN App. No. 201510710643. X, 16 pages.
Hegyi et al., "Hyperspectral imaging with a liquid crystal polarization interferometer", Optics Express, vol. 23, No. 22, 13 pages, Oct. 26, 2015.
Jullien et al., "High-resolution hyperspectral imaging with cascaded liquid crystal cells", Optica, Vo. 4, No. 4, pp. 400-405, Apr. 2017.
Li et al., "GPU accelerated parallel FFT processing for Fourier transform hyperspectral imaging", Applied Optics, vol. 54, No. 13, pp. D91-D99, May 1, 2015.
Porter et al., "Correction of Phase Errors in Fourier Spectroscopy", International Journal of Infrared and Millimeter Naves, vol. 4, No. 2, 273-298, 1983.

* cited by examiner

CONVENTIONAL ANTI-PARALLEL CELL

PARALLEL Pi- (OR OCB) CELL

LIQUID CRYSTAL FOURIER TRANSFORM IMAGING SPECTROMETER

RELATED APPLICATIONS

This application is a divisional of U.S. patent application Ser. No. 14/527,378, filed Oct. 29, 2014, which is incorporated herein in its entirety.

This application is related to U.S. patent application Ser. No. 15/605,625, filed May 25, 2017, and U.S. patent application Ser. No. 14/527,347, filed Oct. 29, 2014, which are incorporated herein in their entirety.

BACKGROUND

Hyperspectral imaging (HSI) collects and processes information from across the UV, visible, and infrared portions of the electromagnetic spectrum. A hyperspectral imager images a band of spectral information at each point in a scene. HSI is frequently employed to increase the depth of information in a scene's image, and thereby increase the image's visual contrast beyond what can be recorded with a conventional monochrome or color camera. This enhanced contrast can be used to detect hard to find or camouflaged objects obscured by visual noise; it can also aid in materials identification. It can be used to assess detailed information about the state of a subject, such as the ripeness of a piece of fruit. Well-known applications of HSI abound for domains as diverse as industrial and agricultural sorting, remote sensing for agriculture and defense, threat identification, and even medicine.

The advent of smartphone technology has provided powerful, mobile platforms that a significant fraction of the world's population carries on their person at most times. There is a trend toward increasing the number and types of sensors present on smartphones, and the computing power of these phones is correspondingly increasing. Smartphones already include multiple image sensors, but they are not currently thought of as candidates for HSI sensors because of the prohibitive size and cost of existing HSI technologies.

DETAILED DESCRIPTION OF THE EMBODIMENTS

Figure 1:
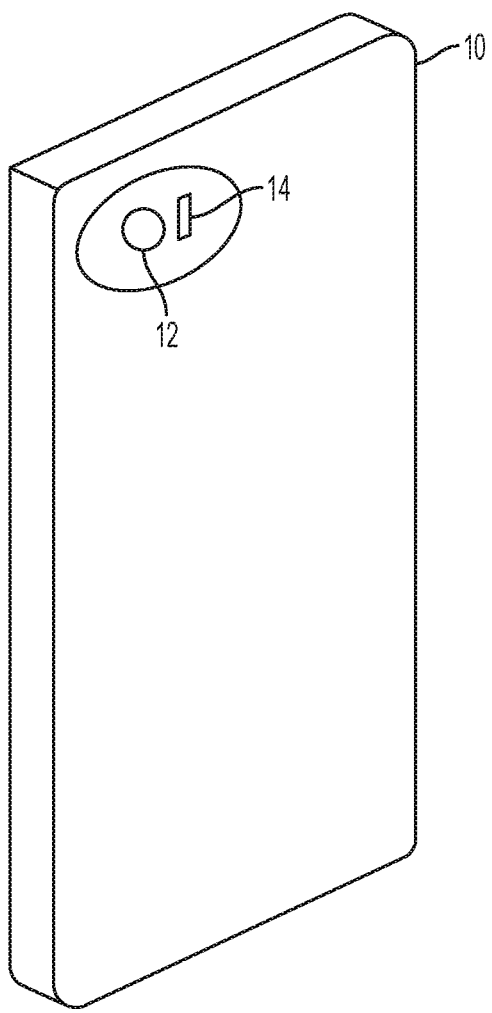
FIG. 1 shows a first view of a device containing a hyperspectral imaging system.

Hyperspectral imaging has many promising use cases such as for sorting, remote sensing and medical applications. The cost, size, and usability of this technology have limited the applications. If one could include a hyperspectral imaging component or device into many common systems, hyperspectral imaging (HSI) could become much more widespread. For example, smartphones are readily available technology platforms for HSI components. Inclusion on the smartphone could push the boundaries of what is possible with HSI, as the smartphone is a general-purpose platform carried by most individuals for which it is easy to develop new applications.

A current state-of-the-art hyperspectral camera might work by scanning a slit or grating, or by having liquid crystal tunable filters that allow imaging at one instantaneous wavelength band. Lower-cost hyperspectral cameras might tile optical bandpass filters on the imaging sensor itself, similar to existing red-green-blue cameras but with more discrete optical bands, trading off with a lower spatial resolution. While liquid crystal tunable filters and optical bandpass filters allow one to obtain an image in a given wavelength band immediately, they do this at the expense of discarding all out-of-band wavelengths.

Typically, one wants to image a scene over a range of wavelengths. It is therefore desirable to record light from all the wavelengths at once, rather than only from one spectral band at a time. This can be achieved using optically multiplexed forms of imaging spectroscopy, such as Fourier transform imaging spectroscopy, that encode wavelength information into a time signal that is recorded by a detector. Any optically multiplexed technique, such as those exemplified in the current embodiments, has gains in optical throughput, a feature known as Fellgett's advantage.

Systems that use gratings and two-dimensional CCDs can record light from all wavelengths simultaneously. This may be done by scanning a slit over something to be imaged. Spatial information is obtained in the long direction of the slit and the short direction is dispersed in wavelength with a grating so the CCD can record all of the wavelengths at once. Spatial information in the short direction of the slit is collected as the slit is scanned in time across the object. The system involving a grating and a slit increases the costs, the complexity and the need for alignment. The embodiments here do not incur these penalties because they merely add a controllable liquid crystal layer to the imaging plane of the CCD or other image sensor. In addition, the use of a slit in such a system restricts the total optical throughput at any given time to the light that passes through the slit. By foregoing the use of slits, Fourier transform imaging spectroscopy systems gain a throughput advantage known as the Jacquinot advantage.

The conventional way to perform Fourier transform imaging spectroscopy is to use an imaging Michelson interferometer, which is a device that splits an imaging path into two arms, and that varies the length of one of the arms while recording the recombined light on an imaging detector. This kind of HSI gains from both the Fellgett and Jacquinot advantages, but it is bulky, costly, and sensitive to vibration and misalignment. The current embodiments suffer from none of these drawbacks.

The embodiments here enable a new class of HSI sensors that have the potential to be extremely small and low-cost, and are capable of being integrated anywhere image sensors are currently used, including on smartphones. The embodiments have advantages in a general-purpose platform like a smartphone because performance parameters such as wavelength resolution, imaging speed, and spectral bands of interest can be selected in software and are not fixed by the hardware configuration. They can be operated in conjunction with an existing image sensor and triggered with the same camera button without disrupting the ability of the sensor to take normal, non-hyperspectral images. The embodiments leverage the computing power of smartphone platforms by shifting most of the system complexity to the electronic/software side, therefore keeping overall system cost low.

In addition, the use of a smartphone or other portable device having wireless or wired communications capability allows the device to communicate the raw HSI data. Alternatively, the device would transmit the analyzed or processed HSI data for use with larger devices, such as medical equipment, or as part of a diagnostic routine.

A portable device-based HSI sensor enables current applications of HSI at the consumer level. More importantly, as HSI becomes widely deployed on a mobile platform and as mobile app developers learn to exploit the capabilities of the new sensor, they undoubtedly will uncover novel and interesting uses for HSI.

Figure 2:
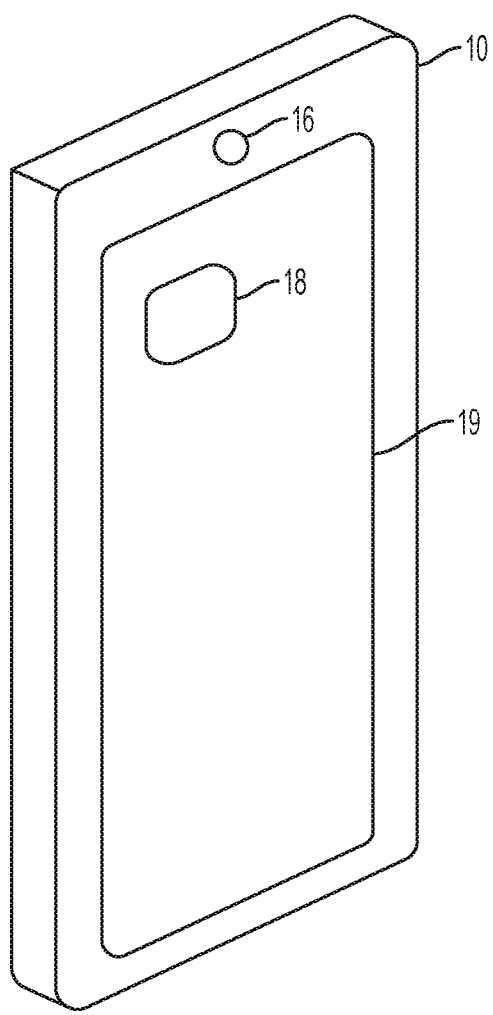
FIG. 2 shows a second view of a device containing a hyperspectral imaging system.

An example of such a device is shown in FIGS. 1 and 2. In FIG. 1, a smartphone device 10 is shown. One must note that while this particular device is shown and may be discussed, no limitation to this type of device is intended or should be implied. Other types of devices that can employ this component include periscopes, optical systems, telescopes, microscopes, lightfield imaging systems, and still and video cameras. In FIG. 1, the HSI component would be in the path of the aperture 12, and may be illuminated with a light 14.

FIG. 2 shows the display side of the smartphone 10. The display side shows the display screen 19 with an example application 18 that would trigger the use of the HSI component. Without the application triggering the HSI component, the HSI imaging component would be inactive, allowing normal (color or monochrome) use of the camera without HSI. The camera 16 that points at the user may also be endowed with an HSI component. A forward-facing cell-phone hyperspectral camera may be especially useful for users to generate HSI images for applications such as medical imaging, etc.

The HSI component consists at least in part of a liquid crystal variable retarder placed between optical polarizers. In certain embodiments, the optical axis of the variable retarder is nominally at 45 degrees with respect to the polarizers. For a given wavelength of incident light that passes through the first polarizer, the system oscillates between transmitting and not transmitting the light as the optical retardation increases. This oscillation occurs because the retarder periodically alters the polarization state of the light as the retardance increases, and the output polarizer functions to alternately block or pass the light after the retarder based on its polarization state.

The intensity oscillations as a function of optical retardance, collectively called the interferogram, occur with a period that depends on the incident wavelength. Each unique incident wavelength oscillates in intensity at a different rate, and the intensity oscillations from a combination of incident wavelengths sum together linearly. The wavelengths can be separated by Fourier transform of the received light as a function of optical retardance or optical phase delay, yielding an optical spectrum. Since the liquid crystal retarder and the image sensor are located in the same or conjugate image planes, the image sensor can independently sample and record the intensity oscillations or interferogram at each point in an image and use this information to calculate a hyperspectral image.

The spectral resolution $\Delta\lambda$ at each wavelength $\lambda$ and each point in the hyperspectral image is given by the formula $\Delta\lambda=2\pi\lambda/\Delta\phi$, where $\Delta\phi$ is the range of optical phase delays at which the interferogram is recorded, expressed in radians. From this formula it is apparent that to resolve wavelength differences significantly smaller than the center wavelength, interferograms must be recorded with ranges of optical phase delay $\Delta\phi \gg 2\pi$. This requirement differentiates the current embodiments from liquid crystal tunable filters that typically do not need to scan the phase delays of their constituent liquid crystal stages beyond a range of $2\pi$. Furthermore, the range of phase delay is a function of wavelength $\lambda$, liquid crystal birefringence $\Delta n$, and position-dependent effective thickness of the image sensor $\beta$, expressed with the following equation: $\Delta\phi=2\pi\Delta n(\lambda, T, V)\beta(x,y)/\lambda$. Here, birefringence is a function of wavelength, temperature T, and liquid crystal voltage V, and expresses the birefringence between two rays normally incident to the liquid crystal cell with ordinary and extraordinary polarization. The change in incidence angle of the chief ray with position of a given pixel on the image sensor, and the corresponding change in optical phase delay range is incorporated into the position-dependent effective thickness $\beta$.

Figure 3:
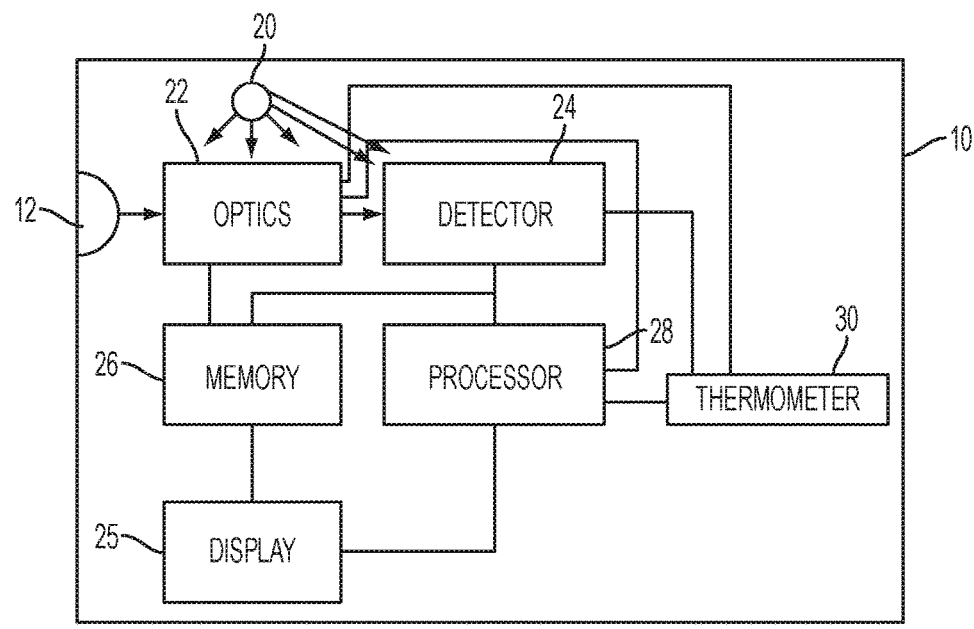
FIG. 3 shows a schematic of a device including a hyperspectral imaging system.

FIG. 3 shows an internal schematic of a device such as 10 that includes an HSI component. This is merely an example of one such device. The light enters the device through the aperture 12 and enters the optics 22, which then transfer the light to the detector 24. The detector may be a focal plane array, which is an array of elements that reside at the focal plane of the optics, such as a charge coupled device (CCD). Whatever the operating principle of the detector, the detector converts the received light into a voltage signal that can be processed by the processor 28. The device may also include memory 26. Memory 26 may store instructions to operate the processor, including instructions that come in the form of applications downloaded to a smartphone, control and configuration information for the processor to manipulate the optics, and data generated by the HSI component as part of the optics 22.

The optics 22 may include a relay lens or other relay optical device as will be discussed in more detail later. The optics may also include an imaging lens. Typically, imaging lenses are fixed relative to the image sensor or detector. However, as this device may consist of a hand-held device, the imaging lens may be movable or the device may have other optical techniques to allow for image stabilization that would compensate for unintended hand movement. Other optical elements may be included in the optics or elsewhere in the system, such as a chromatic compensation device. The optics may be under control of processor 28.

Alternatively, the processor may receive the output signal from the image sensor and perform image stabilization on the output signals. The output signals will typically represent frames of image data detected by the sensor with each frame acquired at a particular state of the liquid crystal variable retarder. The processor may receive at least two output signals from the image sensor, each representing a frame of image data detected at the image sensor. Ideally, there is no relative motion between a scene or objects in a scene and the image sensor during the acquisition of output signals corresponding to a single hyperspectral image. However, because this case of no relative motion is not always practical, the processor may perform an image analysis to determine and apply registration of regions of the image or of objects in the image, compensating such motion. This compensation may eliminate or mitigate the imaging artifacts of images captured while the system is unstable, images of moving objects, and even relative scene motion caused by the beam walk-off phenomenon, to be described subsequently.

Another element of the HSI imager may consist of a retardance or phase compensation layer or compensator such as 43. Such a compensation layer applies a static phase delay at each point in an image, enabling sampling of a different portion of the interferogram than would normally be sampled by applying a voltage waveform to the liquid crystal device. One embodiment of such a compensation layer would achieve net zero retardance in combination with the liquid crystal device when the HSI component is inactive; this would prevent the HSI component from interfering with the normal non-hyperspectral operation of the camera.

Another kind of compensation layer would consist of multiple regions of different phase delays tiled across the image sensor. An example compensation layer consists of two regions, one of phase delay 0 and the other of phase delay D. The liquid crystal device can generate phase delays from 0 to D. Therefore, the region of the image corresponding to the region of the compensation layer with phase delay 0 will produce an interferogram with phase delay from 0 to D, whereas the other region will produce an interferogram with phase delay from D to 2D. If a special lens were used that produced a duplicate image of a scene with one image per compensation layer region, then an interferogram of this scene with phase delay from 0 to 2D could be formed in software by combination of the directly recorded data. This would provide a hyperspectral image with twice the spectral resolution of an interferogram with phase delay from 0 to D yet it would be measured in half the time; however, the image would have half the spatial resolution in one dimension. In general, such retardance compensation layers proffer a convenient means of trading off spatial and spectral resolution and imaging speed.

Figure 4:
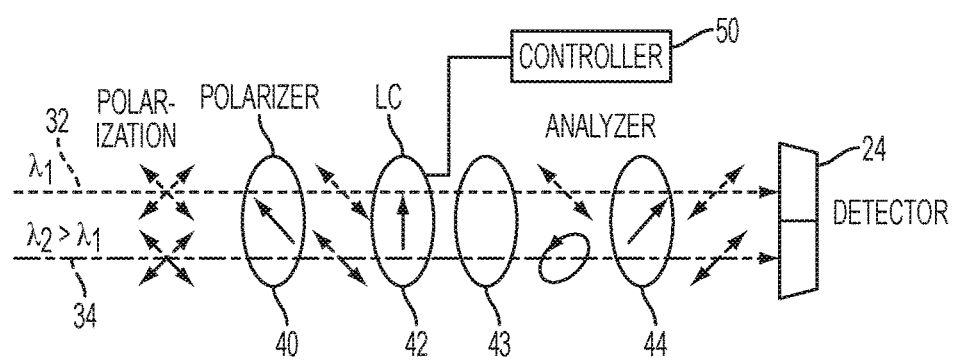
FIG. 4 shows a ray diagram of a hyperspectral imaging optical path.

The HSI component may have many different configurations. FIG. 4 shows one example. In the embodiment shown in FIG. 4, two unpolarized, collimated, monochromatic beams of light 32 and 34 are depicted, with the upper beam having a shorter wavelength $\lambda_1$ than the lower beam, $\lambda_2$. The optical path has a first polarizer 40 that polarizes incident light. The liquid crystal cell 42 has an alignment orientation 45 degrees with respect to the first polarizer.

Figure 5:
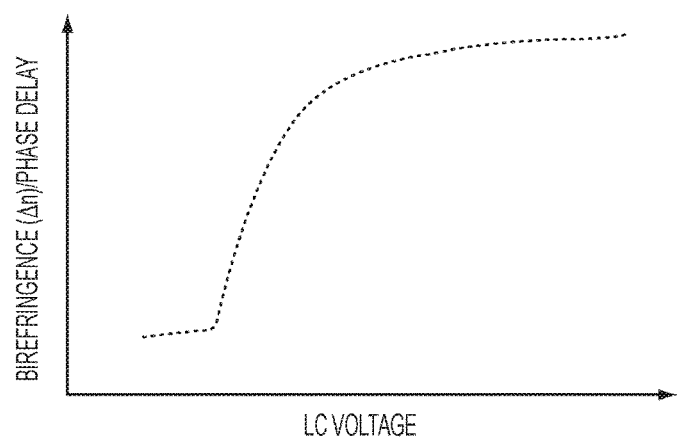
FIG. 5 shows a graph of phase delay versus liquid crystal voltage.

As shown in FIG. 5, varying the voltage on the liquid crystal cell 42 modifies the cell's birefringence, which in turn changes the optical phase delay of the polarization component parallel to the liquid crystal cell's alignment direction with respect to the component that is perpendicular to the liquid crystal cell's alignment direction. The liquid crystal cell has a controller that applies a time-dependent voltage waveform to one or more electrodes on the LC cell. This voltage waveform is chosen to cause the optical phase delay to change at a nominally constant rate over time for a given wavelength. An output polarizer or analyzer 44 converts the variations in polarization induced by the optical phase delay to variations in light intensity. One or more of the polarizers may consist of a wire grid polarizer.

Figure 6:
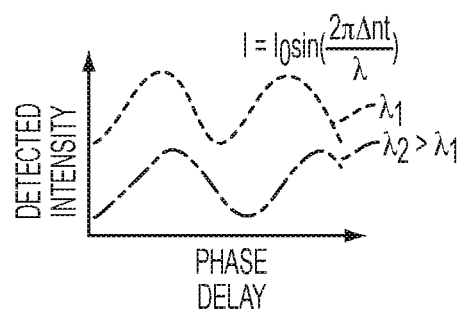
FIG. 6 shows a graph of detected intensity versus phase delay.
Figure 7:
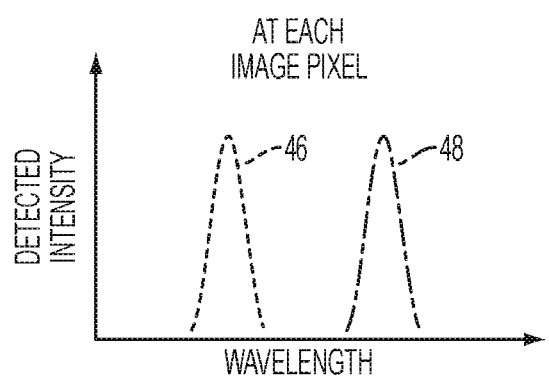
FIG. 7 shows a graph of detected intensity at each pixel versus wavelength.

The resulting time-dependent variations in intensity are picked up by a pixelated detector or focal plane array such as 24, with the detected intensity versus phase delay shown in FIG. 6 and the detected intensity versus wavelength shown in FIG. 7. The upper curve of FIG. 6 corresponds to the detected intensity variations of the shorter wavelength ray 32 in FIG. 4, while the lower curve of FIG. 6 corresponds to the detected intensity variations of the longer wavelength ray 34. Similarly, the peak 46 in FIG. 7 corresponds to the shorter wavelength ray 32 while the peak 48 corresponds to the longer wavelength ray 34.

Figure 8:
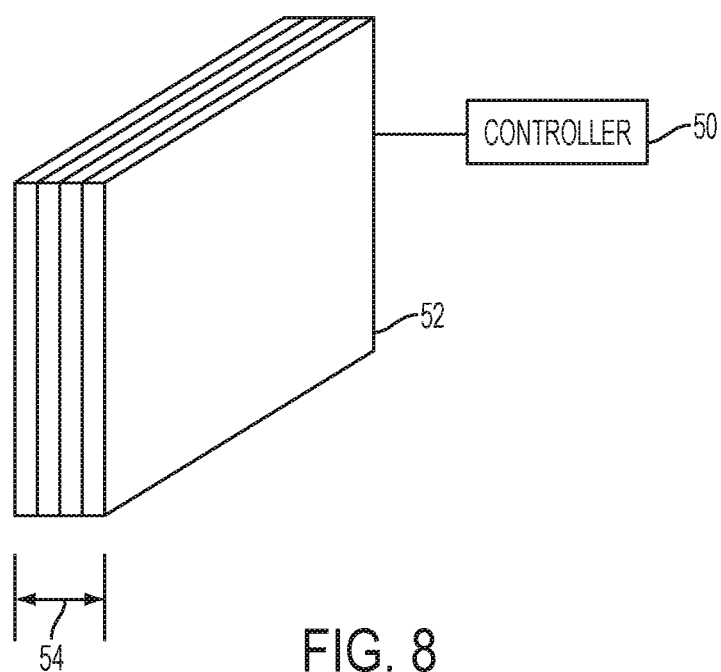
FIG. 8 shows an embodiment of a liquid crystal device consisting of multiple, stacked liquid crystal panels.

Some embodiments achieve high optical path delays between the two polarization components while maintaining low liquid crystal driving voltages and/or fast liquid crystal response times. As is known in the art of Fourier transform spectroscopy, high optical path delays yield high spectral resolution, and are therefore beneficial. However, a high optical path delay generally implies a greater total thickness of liquid crystal. To keep the driving voltages and response times low, a single thick liquid crystal layer can be broken up into multiple layers in series, as shown in FIG. 8. The liquid crystal response time for an individual cell at a given voltage scales as the square of the cell thickness, so two modules with identical path delay, one a single cell, and one split into two cells, would have a switching time differing by a factor of 4. Conversely, if the switching time is held constant, the two modules would differ in switching voltage by a factor of 4. The embodiment of FIG. 8 consists of 4 panels. The panel stack may be controlled by a central controller that manages the optical path delay as well as the liquid crystal response times with proper choice of voltage waveforms. As is known in the art, multilayer stacks of optical components such as the embodiment shown in FIG. 8 benefit from the proper choice and application of antireflection coatings at each optical interface.

Figure 10A:
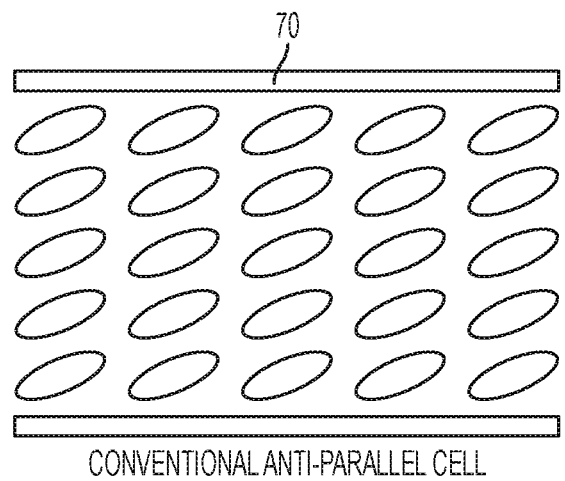
FIGS. 10A and 10B show a comparison between a standard anti-parallel alignment liquid crystal cell and an embodiment of an optically compensated bend cell.

If one layer or cell of a multilayer liquid crystal stack has any symmetry-breaking features, these features should be alternated or opposed between layers such that the stack as a whole retains favorable symmetry properties. Such symmetry-breaking features can be considered to have a polarity, which refers generally to the notion of whether a symmetry-breaking feature is directed along or in opposition to a test direction. The polarity with which electrodes are connected to a voltage source is one such feature, wherein the notion of polarity is immediate. The liquid crystal alignment direction is another such feature, wherein the notion of polarity can be made concrete by considering the rubbing direction of the upper-most electrode of a liquid crystal cell as seen in a cross-sectional depiction of the cell in a plane that is parallel to the LC directors, such as FIG. 10A. If the rubbing direction is to the right, as shown, we can say the cell has positive polarity, whereas the mirror image cell with the rubbing direction to the left would have negative polarity.

For a conventional antiparallel cell, all liquid crystal molecules tend to be oriented in the same direction, which corresponds to the rubbing direction of an electrode. Such a configuration has a first-order dependence of optical path delay on incident light angle as the incident angle deviates from the normal. If two antiparallel cells are stacked with opposite polarities such that their alignment directions oppose each other, then the first order dependencies of optical path delay on incident light angle are equal and opposite and hence cancel each other out. Therefore, by paying careful attention to the arrangement of polarities of symmetry-breaking features of stacks of liquid crystal cells, it is possible to maintain an incident light angle dependence of optical path delay of second order or higher, as well as other advantageous operating characteristics.

It becomes more critical to shorten the response time of the LC cell if the application demands taking multiple hyperspectral images in succession, as in a hyperspectral movie. Typically, LC cells are switched on and then passively allowed to relax. In one embodiment, the LC cell is actively switched between a configuration with a maximal optical phase delay and a configuration with a minimal optical phase delay. This active switching may be implemented in many ways. In one embodiment, each electrode of the pair of electrodes that traditionally surround the LC material has been replaced with a pair of interdigitated electrodes.

Figure 9:
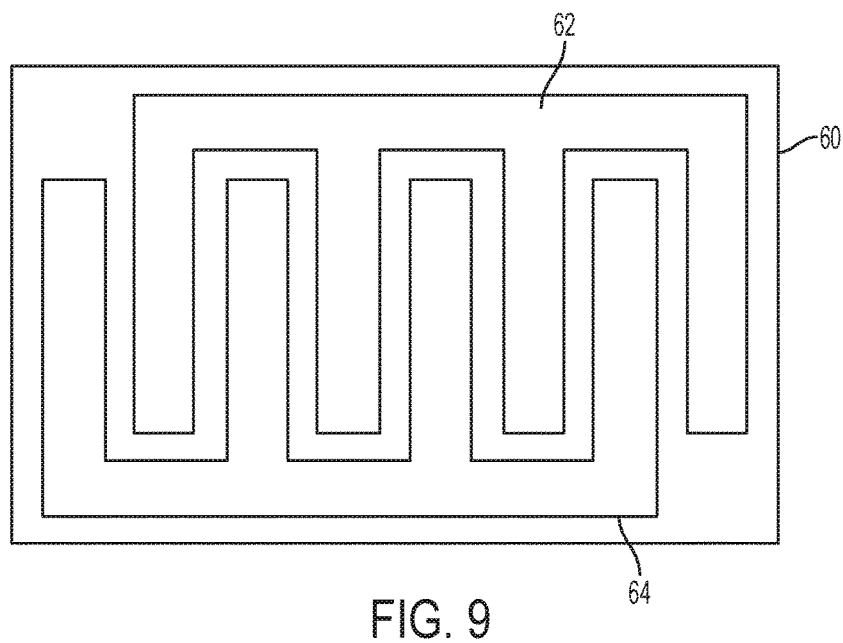
FIG. 9 shows a top view of an electrode panel of one embodiment of a liquid crystal device, having a pair of electrodes on each side of a single liquid-crystal layer

FIG. 9 shows one set of interdigitated electrodes 62 and 64 on panel 60 that would replace one planar electrode in a traditional configuration. This panel would be replicated on the other side of the LC material. In one embodiment, the panels that surround the LC material would include a set of electrodes that allows one to switch the electric field between a primarily perpendicular orientation with respect to the LC substrate, and another pair to switch the electric field to a primarily parallel orientation. By changing the voltages between each set of electrodes, the LC molecules can controllably rotate between perpendicular and parallel orientations, or more generally between an orientation providing a minimal optical phase delay and orientation providing a maximal optical phase delay. These embodiments may be referred to as active on and active off embodiments, wherein the LC material is actively switched between states rather than switching the material to an 'on' state and then passively allowing it to relax. In an alternative embodiment, the material may still be rotated 'uncontrollably' with application of a voltage waveform having a known response, as will be discussed in more detail later.

Another aspect of response times is the selection of the LC material itself. When choosing an LC material, one has to balance multiple factors such as optical birefringence, dielectric anisotropy, and rotational viscosity. An LC material with high optical birefringence would result in thinner cells that achieve the same optical retardance as a thicker cell, with a benefit in lowered response time and/or driving voltage, partially offset by the increased rotational viscosity of such high birefringence materials.

An LC material with a high dielectric anisotropy would produce the same response as a lower dielectric anisotropy material but from a lower drive voltage. An LC material with a lower rotational viscosity would have a faster response time than a material with a higher rotational viscosity. As will be discussed in more detail later, material-dependent properties such as optical dispersion and temperature dependence of refractive index and rotational viscosity can be calibrated out of the system performance, but the LC material may still be selected to optimize the system performance post-calibration. In another embodiment, an LC material and/or LC cell preparation may be used to give the LC a larger 'pretilt' angle because this decreases the LC switching time.

In addition to fast response times, high viewing angles increase the usefulness of the hyperspectral imaging component. While hyperspectral imaging systems currently exist, many of them have limited viewing angle due to the angle-dependent properties of the optical filters employed. As used here, 'viewing angle' refers to the level of invariance of the optical phase delay for a given wavelength and a given state of the liquid crystal component with respect to deviations of the incident light angle from the normal.

Typically, liquid crystal displays (LCDs) are designed as switchable half-wave plates between crossed polarizers that can alternate between light transmitting and light obscuring states. The term 'viewing angle' as used here differs from the conventional usage as applied to typical LCDs, which refers to the angle that a specific contrast ratio is reached between the on and off states. In the embodiments here, the LC may function as a high-order wave plate. Because a single point in an image will be formed with a cone of light rays that has a non-zero numerical aperture (NA), each ray of the cone travels at a different incident angle through the LC cell. Consider the difference in optical phase delay between the ray with the most delay and the ray with the least delay within the cone of light rays that form a single image pixel. As this difference in phase approaches π radians, there becomes an equal contribution from those rays of light within this cone that transmit through the hyperspectral component and those that are obscured by the hyperspectral component, with a corresponding loss of contrast of the interferogram recorded at that image pixel.

High total optical phase delay is necessary to achieve high spectral resolution; therefore, the total variation of the optical phase delay over the incident light angles of the rays corresponding to a single image pixel must be significantly less than π radians. For high spectral resolution imaging, either the imaging NA has to be decreased, or the viewing angle of the LC component must be increased. It is critical to develop techniques that increase the viewing angle to image with high spectral resolution while maintaining high optical throughput.

One particular embodiment that achieves an extended viewing angle uses parallel rubbing layers, known as a pi-cell or optically compensated bend (OCB) cell. The two alignment layers internal to the liquid crystal cell may be rubbed in parallel directions, shown as 72 in FIG. 10, versus in anti-parallel directions, shown as 70 in FIG. 10. This causes the top half of the cell to act like the mirror image of the bottom half with respect to a mirroring plane halfway between the bottom and top halves of the cell, incurring similar symmetry advantages as stacking two anti-parallel cells with opposite alignment directions as discussed previously. Light rays traveling at different angles through the cell, shown in FIG. 11, see the same optical path difference to first order in incident angle between ordinary and extraordinary polarizations. This first-order invariance to incident angle arises because first-order deviations in optical path difference have opposite sign in the top and bottom halves of the cell and therefore cancel each other out.

Figure 10B:
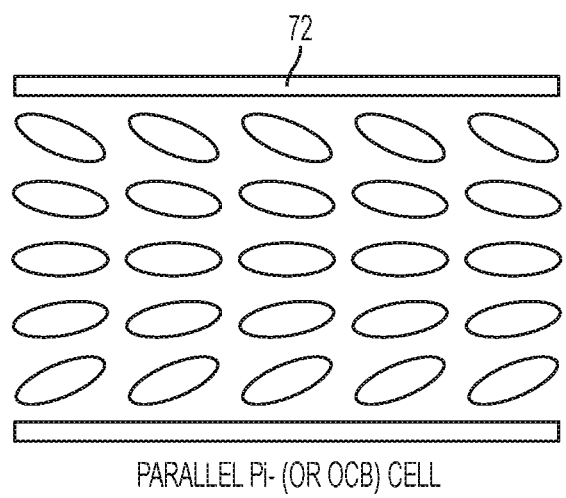
Figure 11:
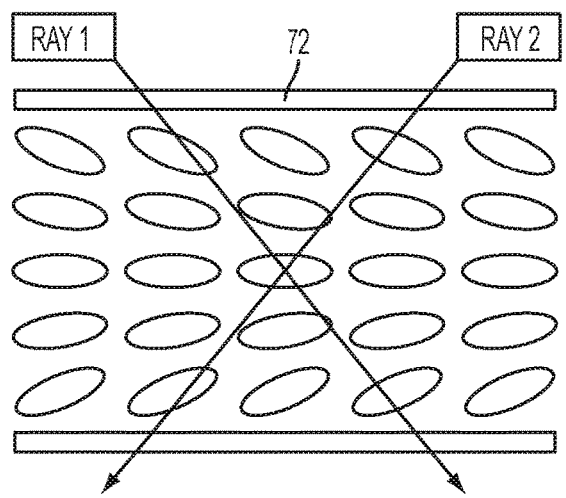
FIG. 11 shows a ray diagram of an optically compensated bend cell.

Another embodiment involves stacking two conventional anti-parallel cells, such as 70 in FIG. 10 with the LC alignment direction of one rotated 180 degrees with respect to the other, as described previously with reference to FIG. 8. This would perform similarly to the pi-cell except with the top and bottom halves housed in separate cells stacked on top of one another, thereby providing advantages of decreased driving voltage and/or faster response. Other embodiments may include single- or multiple-domain, vertically-aligned (VA) LC cells and in-plane-switching (IPS) LC cells.

When light rays travel through a birefringent medium, they can undergo an effect referred to as 'beam walk-off' in which the wave vector and the Poynting vector are no longer parallel. The embodiment of two layers with opposed symmetry provides a remedy for this, because the walk-off of the first would be corrected by the walk-off of the second. In general, symmetry-preserving arrangements of LC cells in which walk-off is cancelled between two cells or two cell halves with opposite symmetry properties could correct this walk-off. IPS LC cells would not have a walk-off issue because beam walk-off is minimal when the wave vector is perpendicular or parallel to the LC director. If walk-off is not corrected, the image may drift as a function of voltage on the LC, creating artifacts on the edges within the image once the Fourier transform was obtained. However, it may still be possible to correct this walk-off algorithmically, neglecting dispersive effects of the liquid crystal, by image registration techniques.

Having demonstrated different embodiments of the structure of the HSI imaging component, the discussion now turns to additional elements and the methods of operating the HSI imager, as well as its calibration.

Figure 12:
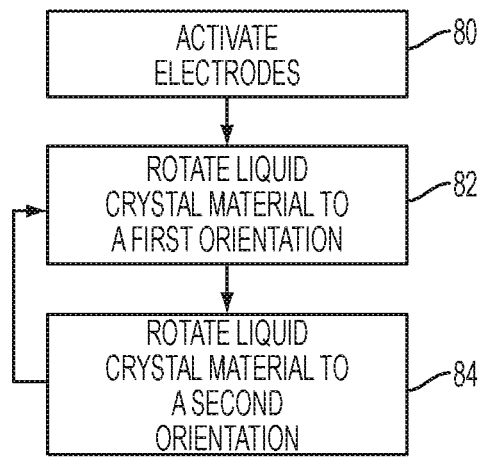
FIG. 12 shows a flowchart of an embodiment of a method of operating a hyperspectral imaging system.

As mentioned above with regard to the active on and active off embodiments, one method of operating the liquid crystal is shown in FIG. 12. At 80, the electrodes, more than likely the multiple pairs discussed with reference to FIG. 9, are activated by a voltage source. The liquid crystal material is then rotated by a first set of electrodes to a first orientation at 82, with either a minimal or maximal optical phase delay between extraordinary and ordinary polarizations, with respect to an imaging sequence of optical phase delays. As needed to obtain the desired images, the liquid crystal material may then be rotated to the second orientation at 84, with a maximal or minimal optical phase delay, passing through an intermediate range of optical phase delays. The choice of which electrodes to drive, with what voltages, may be combined with a choice of frequencies for each driving waveform. As shown in FIG. 12, the rotation can be cycled between the two orientations repeatedly.

Some liquid crystal materials experience a change in sign of the dielectric anisotropy at a certain driving frequency. Driving the material below this frequency causes the molecules to align parallel or perpendicular to the driving electric field, and driving above this frequency causes the molecules to align at 90 degrees with respect to their alignment at the lower frequency. This feature can be used in an active on and active off embodiment by switching the liquid crystal between two orientations with the choice of drive frequency.

Many characteristics of the imaging system may require calibration. For example, the calculated wavelength of a monochromatic source as a function of position over the image sensor may not appear uniform, because the LC cell may have a non-uniform thickness, and there is also a dependence of calculated wavelength on angle of the chief ray at each pixel position. A calibration would take this information into account so that a processed HSI dataset of a monochromatic source, such as a laser, would show a spectral peak at the same wavelength in all image pixels. For example, a laser source may have a wavelength of 532 nanometers. Directing light from the laser source toward the HSI image sensor and then determining the peak wavelength at a certain point on the image sensor may result in a peak being detected at 540 nanometers. The application software could be programmed to adjust for this offset. Due to the smoothly varying nature of this offset as a function of position, the calibration process may be performed at a few points or pixel-binned regions in the image plane and then interpolated across the entire image plane, or it could be performed individually at all pixels.

In addition, the index of refraction/dispersion of the LC, as well as its rotational viscosity and other material parameters, may vary as a function of temperature, and there may be some hysteresis inherent in the switching process. Therefore, the liquid crystal driving waveform should be calibrated and optimized as a function of imaging speed and operating temperature, etc. This calibration may be assisted by pointing the HSI image sensor at a fluorescent light bulb or other light source that has multiple known spectral lines, especially when optical dispersion is present and multiple spectral peaks are needed to estimate the dispersion.

Referring back to FIG. 1, it can be seen that there is a light source 14 pointing away from the aperture to illuminate the subject being imaged. Referring to FIG. 3, one can also see a second light source 20 that may illuminate the sensor or the elements internal to the HSI optical path. Finally, also shown in FIG. 3 is a thermometer 30.

In the calibration process, the light sources included as part of the device may be used as the calibration light source. The sources should have known spectral characteristics that allow adjustment of the various performance characteristics of the hyperspectral sensor based upon those characteristics, such that the calculated spectrum at each image pixel accurately reflects the known spectrum of the calibrated source with the highest possible spectral resolution.

Figure 13:
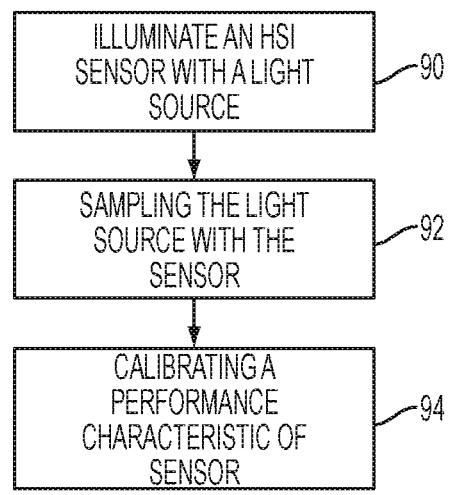
FIG. 13 shows a flowchart of an embodiment of a method of operating a hyperspectral imaging system.

FIG. 13 shows an embodiment of a calibration method. At 90, the HSI sensor is illuminated with a light source. The light source may be a monochromatic inward facing light source, producing light rays that pass directly to the hyperspectral component rather than first reflecting off external scenery. This may allow for calibration of the LC retardance as a function of voltage, or determination of an optimal LC driving waveform, for example. A monochromatic outward facing source may be useful as a spectroscopic source, such as for imaging Raman spectroscopy. The light source may consist of broadband outward or inward facing sources used for illumination, such as infrared LEDs for night vision, or different LEDs with specific spectral output such as a true "white light" source with flatter spectral output than typical white LEDs.

Figure 14:
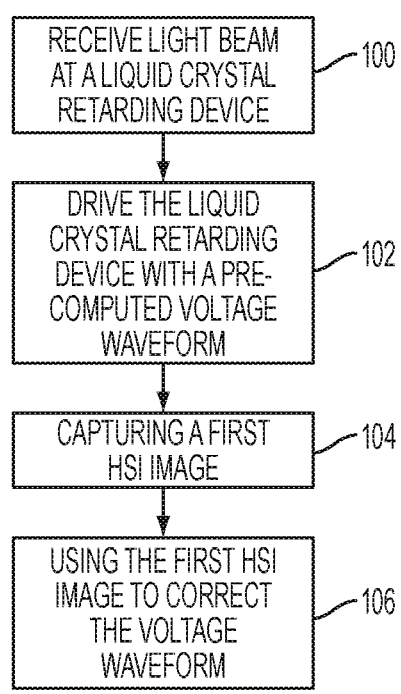
FIG. 14 shows a flowchart of an embodiment of a method of calibrating a hyperspectral imaging system.

In another embodiment related to calibration and switching speed, the LC material does not need to be switched adiabatically between different retardances. Rather, one can take into account the liquid crystal dynamics to create a dynamic driving waveform that monotonically changes the optical retardance as a prescribed function of time. With such a dynamic driving waveform, the transition between the desired retardance states occurs faster than the liquid crystal response time. The optical phase delay between the ordinary and extraordinary rays discussed above can be made to follow a prescribed monotonic function of time with appropriate calibration of the driving waveform. An embodiment of such a method is shown in FIG. 14. At 100, light with known spectral properties, such as from a monochromatic source, is received at the LC cell retarding device. The LC cell is driven with a pre-computed voltage waveform at 102.

The pre-computed voltage waveform may come from modeling the LC material to approximate the voltage driving waveform that would produce the desired optical retardance versus time. This approximate voltage waveform is then used to drive the LC while a hyperspectral image 104 is captured of the received light 100. Given that the spectral properties of the incident light are known, it is possible to calculate the time-dependent optical retardance of the LC cell and compare it to the desired retardance that was used to synthesize the pre-computed voltage waveform. The voltage waveform can be adjusted based on the discrepancy between desired and actual retardance to achieve a more accurate result at 106. For example, the measured center wavelength can be made to more closely approximate a known center wavelength of received light at 100, with better spectral resolution as well, after proper adjustment of the driving voltage waveform. Another option would be to have the retardance versus time characteristic follow a linear trajectory. Any or all of the performance characteristics, calibration information, and properties of the light used for calibration can be stored in look-up tables to allow for comparison and adjustments.

One should note that the system may use calibration data from other sources, rather than generating the calibration data itself. While the above discussion stores the calibration data generated by a self-calibration process, the look-up tables may also store calibration data provided with the system, available from other sources, etc. There is no limitation intended nor should any be assumed that the only calibration data available is if the system performs the above process.

In some embodiments it may be advantageous to perform pixel binning, whereby the intensity values recorded at neighboring pixels in a region are summed together either directly on the image sensor or later in software. If the pixels are binned together at the image sensor before they are read out, it is generally possible to increase the frame rate of the image sensor. This assumes a fixed maximum communication speed between the image sensor and the device that records the data from the image sensor. Varying the number of pixels binned thus allows one to trade-off between spatial resolution and imaging speed, and since there is also a tradeoff between imaging speed and spectral resolution, pixel binning is yet another method to trade off between spectral and spatial resolution and imaging speed. In addition, pixel binning may be important for increasing the signal to noise ratio of an image, especially when signals are weak and minimal spatial resolution is needed. In an extreme limit, all pixels could be binned together, and the embodiment would function as a non-imaging Fourier spectrometer.

Pixel binning may be particularly useful for calibration of various smoothly-varying position-dependent quantities of the HSI sensor such as the position-dependent variation in optical phase delay at a given wavelength and state of the liquid crystal. In order to get reliable calibration information it may be necessary to achieve a high signal to noise ratio, whereas not much spatial resolution would be needed because of the smoothly varying nature of the quantities needing calibration. Calibration information for the whole image sensor could be interpolated from the measured results.

Other modifications and embodiments are possible. In order to decrease imaging time, for example, the system could include an optical bandpass filter, such as a Bayer filter, in front of the HSI component to restrict light hitting the sensor to a known spectral band, allowing subsampling of the interferogram without aliasing. An electronic digital or analog bandpass filter that filtered the signals recorded at each image pixel would achieve the same effect. An optical filter may also increase the spectral resolution if one is imaging a spectral feature that occurs near a sharp cutoff of a filter that has sharp cutoffs. As used here, a sharp cutoff, or transition between the passband and the stopband, is one that is sharper than the full width at half maximum of a spectral peak that would be obtained from a monochromatic source if the filter were not present. Such a filter would yield information as to whether the spectral peak occurred below or above the filter cutoff.

Other types of optical filters or optical components, such as different types of optical films, may also be employed in certain embodiments. For example, a retardance compensation device such as a film may be used to achieve a net-zero retardance in the "on" or "off" state of the LC. The filter or film may also provide chromatic compensation to correct for the dispersive effects of the liquid crystal. Or, standard antireflection coatings may be used on/in the LC cells.

The LC electrodes may consist of graphene or other material with high conductivity and high optical transparency. Especially when considering the multilayer embodiments of the present invention, the light reflected or absorbed from the electrodes must be minimized.

Many of the embodiments discussed above have assumed the presence of the HSI imaging component in the same system as a traditional camera, with the HSI component having a zero-retardance mode to allow the traditional camera to operate without obtrusion. However, it may be desirable to have the HSI component not in the final focal plane of the image sensor, but instead in a conjugate of the focal plane and linked to the final focal plane by one or more sets of relay optics. This would enable an add-on module to be used with existing cell phones or cameras, whereby the add-on would be a hyperspectral component that would control or be controlled by the existing cell phone/camera to synchronize the driving of the liquid crystal cells with the acquisition of individual image frames.

The methods and device above may be employed by one of several applications, such as medical imaging, sorting, spectroscopy of material discovered in the field, etc. Each of these may have its own software program, typically referred to as an 'app' in the smartphone world. As mentioned previously, an HSI component may be integrated into many different types of mobile devices, such as phones, tablets, etc., as well as more traditional lab equipment like microscopes and telescopes.

One specific application that may be enabled by this system is the ability of a user to use the HSI system as a medical diagnostics device, for example for colorimetric readout of home medical diagnostic tests. The user could take one or more HSI images of body locations and/or medical diagnostic testing strips. The resultant HSI images can be fully or partially processed into diagnostic information using the system's included processing power, or the images can be processed in the cloud. With the included communications link, the diagnostic information can ultimately be forwarded to a doctor or laboratory.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of operating a hyperspectral imaging device, comprising:
   receiving a light beam at a liquid crystal retarding device;
   pre-computing a voltage waveform based on a dynamic model of liquid crystal material in the liquid crystal variable retarding device that takes into account liquid crystal dynamics of the liquid crystal retarding device to change the optical retardance of the liquid crystal retarding device as a prescribed function of time, the pre-computed voltage waveform producing a controlled retardance versus time trajectory, wherein transitions between at least some retardance states of the liquid crystal variable retarding device along the trajectory occur faster than a response time of the liquid crystal variable retarding device; and driving the liquid crystal retarding device with the pre-computed voltage waveform.

2. The method of claim 1, further comprising:

obtaining a first hyperspectral image; and using information from the first hyperspectral image to correct the voltage waveform prior to obtaining a next hyperspectral image.

3. The method of claim 1, further comprising storing corrections to the voltage waveform in a memory.

4. The method of claim 1, wherein the pre-computed voltage waveform is a dynamic waveform.

5. The method of claim 1, wherein the pre-computed voltage waveform causes a retardance of the liquid crystal retarding device to vary linearly over time.

6. The method of claim 1, further comprising sensing the light beam at an image sensor after the light beam passes through the liquid crystal retarding device.

7. The method of claim 2, wherein using information to correct the voltage waveform comprises finding an optimal time-varying voltage waveform for each total image acquisition time and each temperature.

8. The method of claim 1, wherein two individual image frames are acquired within a time interval shorter than a response time of the liquid crystal variable retarding device.

* * * * *